United States Patent
Musashi et al.

(10) Patent No.: US 7,697,239 B2
(45) Date of Patent: Apr. 13, 2010

(54) MAGNETIC HEAD, METHOD OF MANUFACTURING THE MAGNETIC HEAD, AND MAGNETIC DISK DEVICE

(75) Inventors: Takayuki Musashi, Kawasaki (JP); Yoshiharu Kasamatsu, Kawasaki (JP); Jun Watanabe, Kawasaki (JP)

(73) Assignee: Toshiba Storage Device Corporation, Tokyo (JP)

( * ) Notice: Subject to any disclaimer, the term of this patent is extended or adjusted under 35 U.S.C. 154(b) by 415 days.

(21) Appl. No.: 11/819,073

(22) Filed: Jun. 25, 2007

(65) Prior Publication Data

US 2007/0253108 A1 Nov. 1, 2007

Related U.S. Application Data

(63) Continuation of application No. PCT/JP2004/019652, filed on Dec. 28, 2004.

(51) Int. Cl.
*G11B 5/147* (2006.01)
(52) U.S. Cl. ................................. 360/254.8
(58) Field of Classification Search ........... 360/254.8, 360/354.7, 255, 256.2
See application file for complete search history.

(56) References Cited

U.S. PATENT DOCUMENTS

| | | | | |
|---|---|---|---|---|
| 5,568,466 A | * | 10/1996 | Komaki et al. | 369/275.2 |
| 7,139,154 B2 | * | 11/2006 | Iwahara et al. | 360/245.9 |
| 7,165,314 B2 | * | 1/2007 | Wang et al. | 29/603.06 |
| 7,440,233 B2 | * | 10/2008 | Takahashi | 360/135 |
| 2006/0221502 A1 | * | 10/2006 | Watanabe et al. | 360/235.8 |
| 2007/0141401 A1 | * | 6/2007 | Maeda et al. | 428/831.2 |

FOREIGN PATENT DOCUMENTS

| | | |
|---|---|---|
| JP | 2000-30387 | 1/2000 |
| JP | 2000-132937 | 5/2000 |
| JP | 2001-60305 | 3/2001 |
| JP | 2002-367313 | 12/2002 |
| JP | 2003-523592 | 8/2003 |

* cited by examiner

*Primary Examiner*—Allen T Cao
(74) *Attorney, Agent, or Firm*—Kratz, Quintos & Hanson, LLP

(57) ABSTRACT

A magnetic head used in a lamp load type magnetic disk device is disclosed. The magnetic head includes a head slider having a recording element and/or a reproducing element, and a suspension that supports the head slider. The suspension includes a magnetic head support unit arranged at its tip portion. The magnetic head support unit comes into contact with a lamp unit of the magnetic disk device when at least one of magnetic head loading operations and magnetic head unloading operations are performed and has a surface on which a lubricating layer is formed.

20 Claims, 10 Drawing Sheets

MAGNETIC HEAD, METHOD OF MANUFACTURING THE MAGNETIC HEAD, AND MAGNETIC DISK DEVICE

CROSS REFERENCE TO RELATED APPLICATIONS

This application is a U.S. continuation application filed under 35 USC 111(a) claiming benefit under 35 USC 120 and 365(c) of PCT application JP2004/019652, filed on Dec. 28, 2004, the entire contents of which are hereby incorporated by reference.

BACKGROUND OF THE INVENTION

1. Field of the Invention

The present invention relates to a lamp load type magnetic head, a manufacturing thereof, and a magnetic disk device including such a magnetic head.

2. Description of the Related Art

With the dramatic increase in communication speed and the amount of information being handled in communications technology, the magnetic disk device, particularly the hard disk device, is starting to be widely used in a variety of applications. The hard disk device is being adapted to have a large capacity, high recording density, high speed access, small size, and reduced weight to be installed in a notebook type personal computer or a potable terminal, for example.

In a hard disk device, recording/reproducing operations are enabled with a magnetic head flying closely over the surface of a rotating magnetic disk, the flying height of the magnetic head being around a dozen nanometers (nm). When the recording/reproducing operations are not performed, rotation of the magnetic disk is stopped, and the magnetic head is held at a standstill in contact with the surface of the magnetic disk. However, when external shock is applied to the hard disk device when the magnetic head is in such as state, the magnetic head may hit the surface of the magnetic disk to damage the surface of the magnetic disk, for example, and as a result, information recorded on the magnetic disk may not be reproduced.

In view of such a problem, a lamp load system may be implemented for moving the magnetic head away from the magnetic disk surface when it is not in use. For example, in FIG. 1, a magnetic head 100 flies over a magnetic disk 103 at a position indicated by arrow A during recording/reproducing operations. After the recording/reproducing operations are ended, the recording head 100 moves toward the outer perimeter side of the magnetic disk 103 so that a load bar 102 arranged at the tip of the magnetic head 100 comes into contact with a lamp unit 104 (at a position indicated by arrow B). Then, the load bar 102 is moved upward while being held in contact with a sloped portion of the lamp unit 104, and at the same time, a head slider 101 is raised from the surface of the magnetic disk 103 so that the magnetic head 100 may be moved to a position indicated by arrow C and stopped thereat. In this way, the magnetic head 100 may be unloaded. Upon loading the magnetic head 100, the load bar 102 is moved toward the magnetic disk 103 while being held in contact with the lamp unit 104. Then, an air bearing is formed between the head slider 101 and the surface of the magnetic disk 103, and the load bar 102 moves away from the lamp unit 104 to fly over the surface of the magnetic disk 103.

Normally, the load bar 102 is made of metal such as stainless steel, and the lamp unit 104 is made of resin material. Upon loading/unloading the magnetic head 100, the load bar 102 is held in contact with the lamp 104 as it is moved. Thus, when the loading/unloading operations are repeatedly performed, abrasive powder may be generated at the resin lamp unit 104 by the sliding motion. The abrasive powder may be adhered to the load bar 102 to then land on the surface of the magnetic disk 103 when the magnetic head is loaded. Further, the abrasive powder may be adhered to the slider surface of the magnetic head 100. When such abrasive powder or clusters thereof reside between the slider surface of the magnetic head 100 and the surface of the magnetic disk 103, the flying stability of the magnetic head may be degraded to eventually lead to head crash, for example.

In view of such a problem, for example, Japanese Laid-Open Patent Publication No. 2000-132937 discloses a magnetic disk device that prevents such abrasive powder from adhering to the surface of a magnetic disk by arranging a trench at a lamp unit to receive the abrasive powder.

However, even by implementing such measures, small amounts of abrasive powder may still penetrate into the space in which the magnetic disk and the magnetic head are arranged, and in such a case, the abrasive powder may not be prevented from adhering to the surface of the magnetic disk.

SUMMARY OF THE INVENTION

Embodiments of the present invention relate to techniques for providing a reliable magnetic head that is configured to prevent generation of abrasive powder from a lamp unit as a result of sliding motion between the magnetic head and the lamp unit, a method of manufacturing such a magnetic head, and a magnetic disk device including such a magnetic head.

According to one embodiment of the present invention, a magnetic head used in a lamp load type magnetic disk device is provided, the magnetic head including:

a head slider having a recording element and/or a reproducing element; and a suspension that supports the head slider; wherein the suspension includes a magnetic head support unit arranged at a tip portion which magnetic head support unit comes into contact with a lamp unit of the magnetic disk device when magnetic head loading operations or magnetic head unloading operations are performed and has a surface on which a lubricating layer is formed.

According to one aspect of the present embodiment, by forming a the lubricating layer on the surface of the magnetic head support unit, the friction coefficient between the magnetic head support unit and the lamp unit may be reduced and generation of abrasive powder as a result of the sliding motion between the lamp unit and the magnetic head support unit may be prevented.

In one preferred embodiment, the lubricating layer may include a chemical adsorption layer that forms a chemical bond with the surface of the magnetic head support unit. According to one aspect of the present embodiment, the lubricant molecules of the lubricating layer form a chemical bond with the surface of the magnetic head support unit so that a tight bond may be realized between the lubricant molecules and the surface of the magnetic head support unit. In this way, scattering of the molecules and abrasion of the lamp unit may be prevented when the magnetic head support unit comes into contact with the lamp unit during magnetic head loading operations and magnetic head unloading operations and generation of abrasive powder may be prevented over a relatively long period of time.

According to another embodiment of the present invention, a lamp load type magnetic disk device is provided that includes:

a magnetic disk;

a lamp unit; and a magnetic head that includes a head slider having a recording element and/or a reproducing element, and a suspension that supports the head slider; wherein the suspension includes a magnetic head support unit arranged at a tip portion which magnetic head support unit comes into contact with the lamp unit when magnetic head loading operations or magnetic head unloading operations are performed and has a surface on which a lubricating layer is formed.

According to one aspect of the present embodiment, by arranging the lubricating layer on the magnetic head support unit of the magnetic head, the friction coefficient between the magnetic head support unit and the lamp unit may be reduced and generation of abrasive powder as a result of the sliding motion between the lamp unit and the magnetic head support unit may be prevented. In this way, instances in which abrasive powder sticks to the surface of the magnetic disk or the head slider surface of the magnetic head may be prevented so that stability of the flying characteristics of the magnetic head may be maintained and reliability of the magnetic disk device may be maintained for a relatively long time.

In one preferred embodiment, another lubricating layer may be formed on the surface of the lamp unit. In this way, the friction coefficient between the magnetic head support unit and the lamp unit may be reduced and generation of abrasive powder from the lamp unit may be prevented even further, for example.

According to another embodiment of the present invention, a method of manufacturing a magnetic head that is used in a lamp load type magnetic disk device is provided, the method including the steps of:

assembling a suspension that includes a magnetic head support unit that comes into contact with a lamp unit of the magnetic disk device when magnetic head loading operations or magnetic head unloading operations are performed; and forming a lubricating layer on a surface of the magnetic head support unit.

According to an aspect of the present embodiment, by forming a lubricating layer on the surface of the magnetic head support unit of the suspension, the friction coefficient between the magnetic head support unit and the lamp unit may be reduced and generation of abrasive powder as a result of the sliding motion between the lamp unit and the magnetic head support unit may be prevented.

In one preferred embodiment, the step of forming the lubricating layer may include a process of applying on the surface of the magnetic head support unit a lubricant diluent solution that is prepared by diluting a lubricant made up of a lubricant molecule having a perfluororohydrocarbon main chain or a perfluoropolyether main chain.

In a further preferred embodiment, the step of forming the lubricating layer may include a lubricating layer fixing process for creating a chemical adsorption layer that forms a chemical bond with the surface of the magnetic head support unit which lubricating layer fixing process is performed after the process of applying the lubricant diluent solution. According to an aspect of the present embodiment, a chemical bond is formed between the lubricant molecules of the lubricating layer and the surface of the magnetic head support unit so that the lubricating layer may be tightly bonded to the surface of the magnetic head support unit. In this way, scattering of the molecules and abrasion of the lamp unit may be prevented and generation of abrasion powder from the lamp unit may be prevented over a relatively long period of time, for example.

DESCRIPTION OF THE PREFERRED EMBODIMENTS

In the following, preferred embodiments of the present invention are described with reference to the accompanying drawings.

Figure 1:
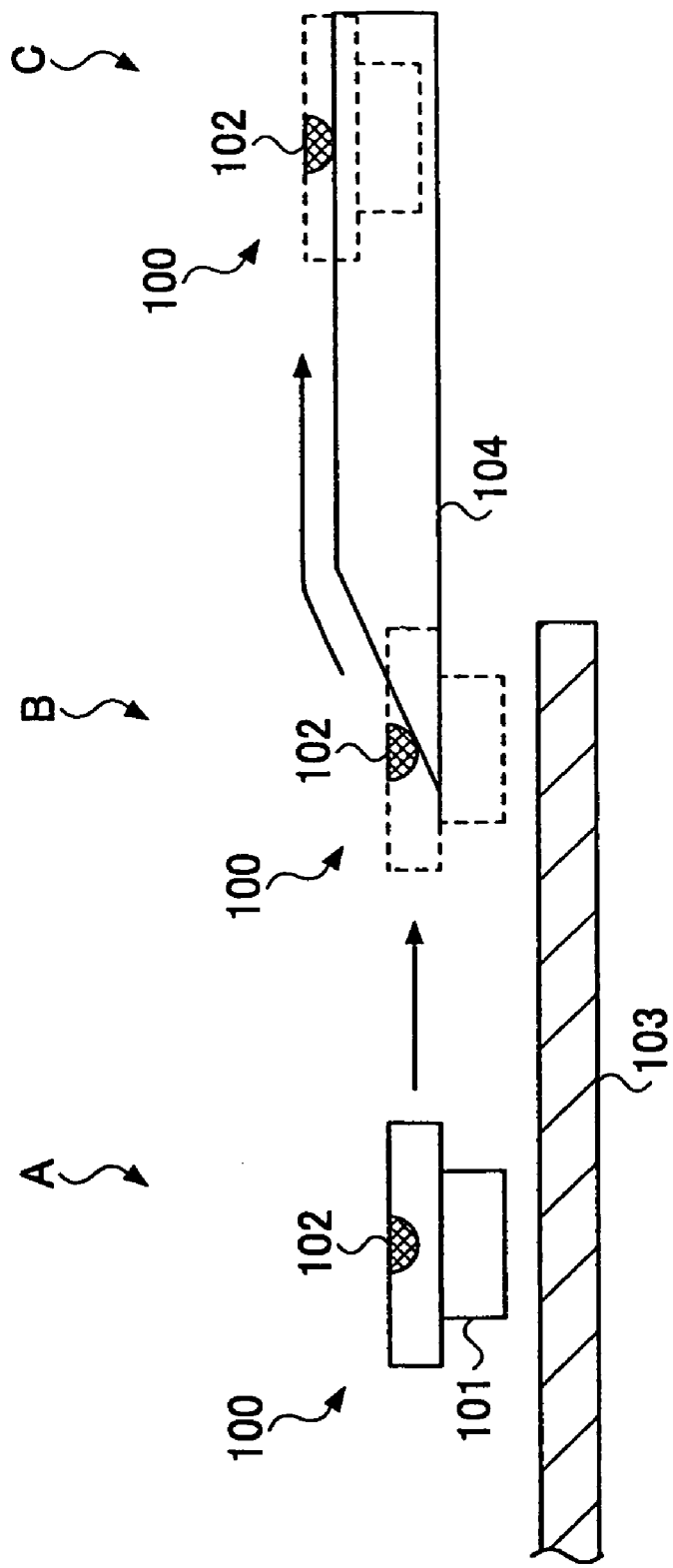
FIG. 1 is a diagram illustrating magnetic head loading and unloading operations according to the prior art.
Figure 2:
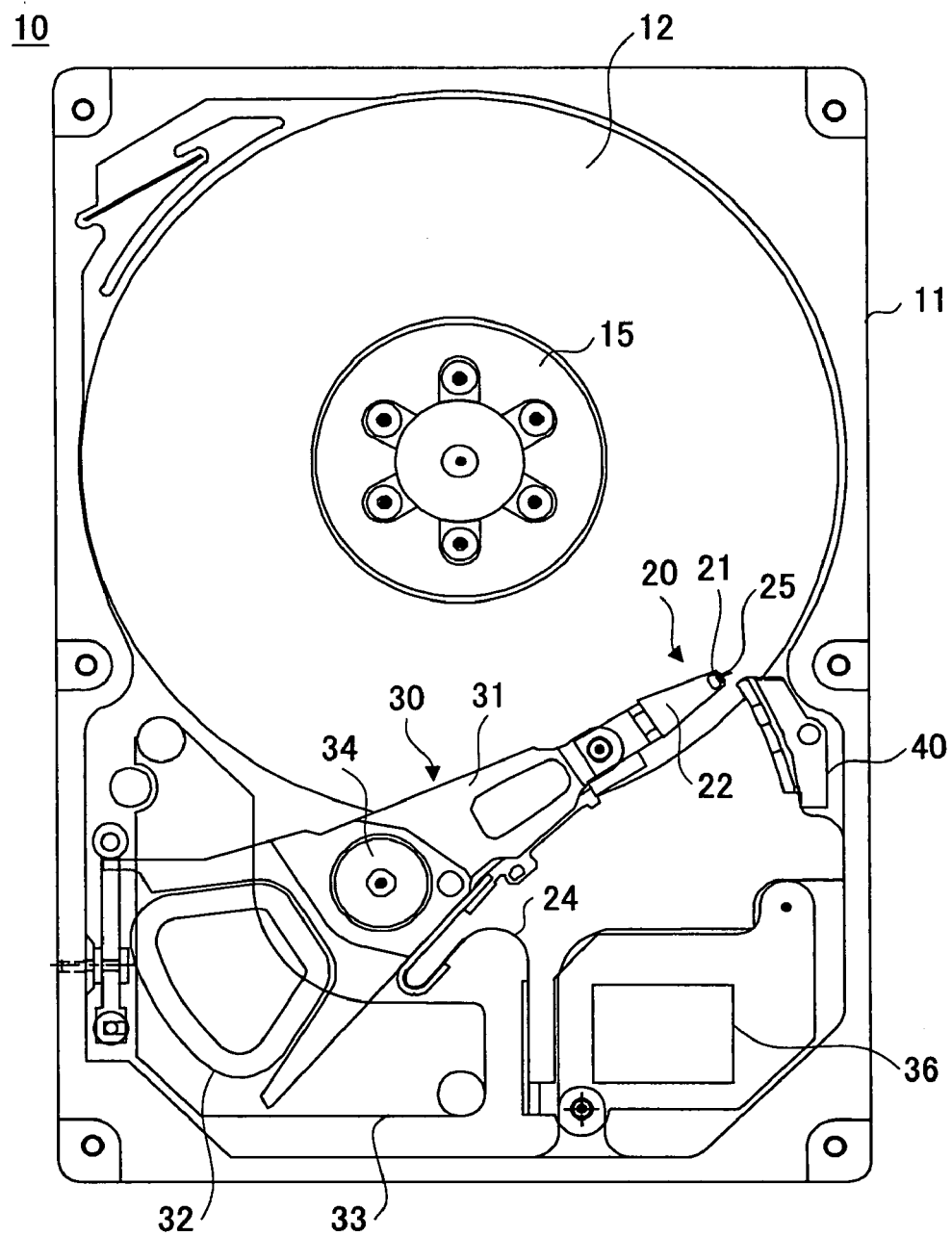
FIG. 2 is a plan view of a relevant part of a magnetic disk device according to an embodiment of the present invention.

FIG. 2 is a plan view of a relevant part of a magnetic disk device according to an embodiment of the present invention.

The magnetic disk device 10 as is shown in FIG. 2 includes a magnetic disk 12, a magnetic head 20, and an actuator 30 that are accommodated within a disk enclosure 11. It is noted that the disk enclosure 11 is sealed by a top lid (not shown) so that dust and other matter from the external atmosphere may be prevented from penetrating into the disk enclosure 11.

The magnetic disk 12, which is fixed to a hub 15, may be driven and rotated by a spindle motor (not shown) that is arranged at the rear side of the magnetic disk 12. The magnetic disk 12 includes a disk-shaped substrate, a magnetic layer on which information may be written by controlling its magnetization direction, a protective layer for preventing mechanical damage or oxidation of the surface of the magnetic layer, and a lubricating layer formed on the protective layer. The magnetic layer may be an in-plane magnetization film having magnetization directions parallel to the substrate in a case where the longitudinal magnetic recording technique is implemented, and the magnetic layer may be a perpendicular magnetization film having magnetization directions perpendicular to the substrate in a case where the perpendicular magnetic recording technique is implemented.

Figure 3:
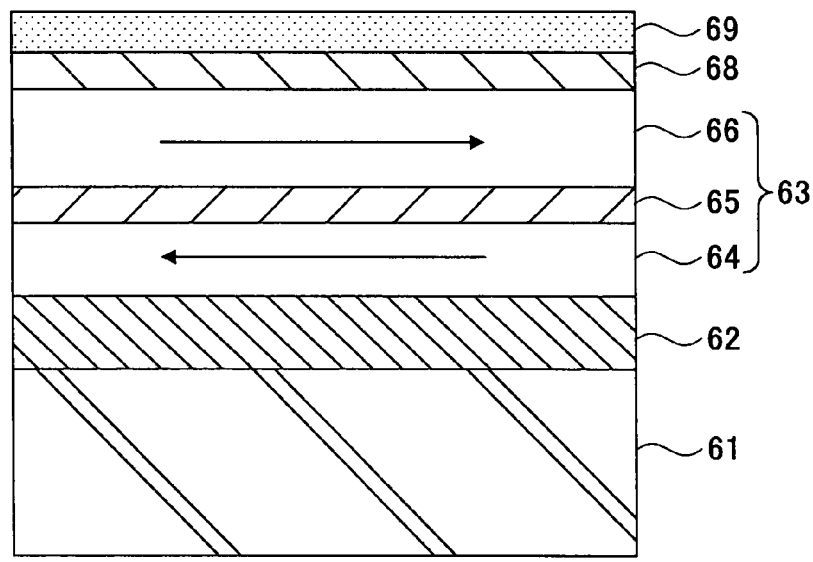
FIG. 3 is a diagram illustrating an exemplary magnetic disk used in longitudinal magnetic recording that may be included in the magnetic disk device according to the present embodiment.

FIG. 3 is a diagram illustrating an exemplary magnetic disk used in longitudinal magnetic recording that may be included in the magnetic disk device according to the present embodiment.

The magnetic disk 12A as is shown in FIG. 3 includes a disk-shaped substrate 61 on which an underlayer 62, a recording layer 63, a protective film 68, and a lubricating layer 69 are laminated in this order. The substrate 61 may be a plastic substrate, a glass substrate, or a NiP-plated aluminum alloy substrate, for example, and a texture process may optionally be performed on its surface.

The underlayer 62 may be made of Cr or a CR—X alloy (X denoting Mo, W, V, B, or an alloy of at least one of the above elements). The underlayer 62 orients the magnetizations of a first magnetic layer 64 and a second magnetic layer 66 to be substantially parallel to the surface of the substrate 61 (referred to as 'in-plane orientation' hereinafter).

The recording layer 63 includes the first magnetic layer 64, the non-magnetic coupling layer 65, and the second magnetic layer 66 that are arranged into an antiferromagnetic exchange coupled structure where the first magnetic layer 64 and the second magnetic layer 66 are coupled via the non-magnetic coupling layer 65. The in-plane oriented magnetizations of the first magnetic layer 64 and the second magnetic layer 66 are in opposing parallel directions with each other when no external magnetic filed is applied thereto. In other words, the illustrated magnetic disk is a so-called Synthetic Ferromagnetic Media (SFM).

The first magnetic layer 64 and the second magnetic layer 66 are arranged to have thicknesses of 0.5-20 nm, and may be made of Co, Ni, Fe, a Co alloy, a Ni alloy, or a Fe alloy, for example. It is noted that CoCrTa or CoCrPt are preferably used as the Co alloy, and CoCrPt-M (M denoting B, Mo, Nb, Ta, W, Cu, or an alloy of at least one of the above elements) is particularly preferred in view of the controlling the grain diameter of crystal grains. In one example, the first magnetic layer 64 may be a multi-layer laminated structure including plural layers of the above-mentioned materials. In this way, the in-plane orientation of the second magnetic layer may be improved, for example.

The non-magnetic coupling layer 65 may have a thickness of 0.4-1.5 nm, and be made of Ru, Rh, Ir, a Ru alloy, a Rh alloy, or an Ir alloy, for example.

It is noted that the recording layer 63 is not limited to having just two magnetic layers and may also include three or more magnetic layers that are exchange coupled to each other provided that antiferromagnetic coupling is realized between at least two of the magnetic layers. In another example, the recording layer 63 may be made of a single magnetic layer.

The protective film 68 may have a thickness of 0.5-10 nm (more preferably 0.5-5 nm) and be made of diamond-like carbon (so-called hydrogenated carbon), nitrided carbon, or amorphous carbon, for example.

The lubricating layer 69 may have a thickness of 0.5-3.0 nm and be made of a fluorine lubricant with molecules having a perfluoropolyether main chain and a CF2CHOH end group or a piperonyl end group, for example. Specifically, Fomblin (registered trademark) Z-Dol (product name) or AM3001 (product name) by Solvay Solexis may be used as the lubricant layer 69, for example.

Figure 4:
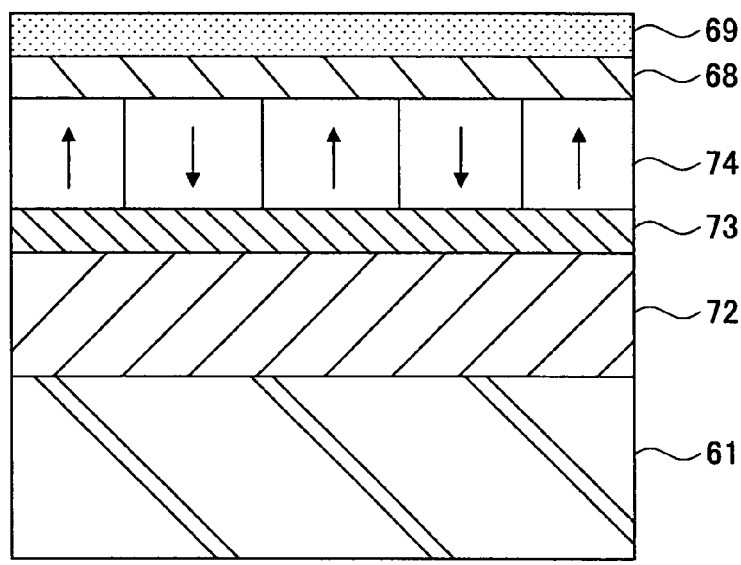
FIG. 4 is a diagram illustrating an exemplary magnetic disk used in perpendicular magnetic recording that may be included in the magnetic disk device according to the present embodiment.

FIG. 4 is a diagram illustrating a magnetic disk used in perpendicular magnetic recording that may be included in the magnetic disk device according to the present embodiment. In this drawing, components that are identical to those shown in FIG. 3 are given the same reference numerals and their descriptions are omitted.

The magnetic disk 12B shown in FIG. 4 include a substrate 61 on which a soft magnetic liner layer 72, a nonmagnetic intermediate layer 73, a recording layer 74, a protective film 68, and a lubricating layer 69 are arranged in this order.

The soft magnetic liner layer 72 may have a thickness of 50 nm to 2 μm and may be made of a non-crystalline or microcrystalline soft magnetic alloy including at least one of the elements Fe, Co, Ni, Al, Si, Ta, Ti, Zr, Hf, V, Nb, C, and B; or plural layers of the above-mentioned soft magnetic alloys, for example. Specifically, alloys such as FeSi, FeAlSi, FeTaC, CoNbZr, CoCrNb, or NiFeNb may be used as the soft magnetic liner layer 72, for example. The nonmagnetic intermediate layer 73 may have a thickness of 2-30 nm and be made of nonmagnetic material such as Cr, Ru, Re, Ri, Hf, or an alloy including at least one of the above metal materials. For example, the nonmagnetic intermediate layer 73 may be a Ru film, a RuCo film, or a CoCr film that preferably has a hcp structure.

The recording layer 74 is a so-called perpendicular magnetization film having an easy axis of magnetization in the film thickness directions. The recording layer 74 may have a thickness of 3-30 nm and be made of a ferromagnetic alloy including Ni, Fe, Co, a Ni alloy, a Fe alloy, or a Co alloy selected from a group consisting of CoCrTa, CoCrPt, CoCrPt-M (M denoting B, Mo, Nb, Ta, W, Cu, or an alloy of at least one of the above elements).

In one embodiment, the recording layer 74 may include a nonmagnetic phase for physically separating the crystal grains of the ferromagnetic alloy prismatic structure from adjacent crystal grains which nonmagnetic phase may be made of a compound of an element selected from a group consisting of Si, Al, Ta, Zr, Y, and Mg and an element selected from another group consisting of O, C, and N. For example, the recording layer 74 may include (CoPt)—($SiO_2$) (CoCrPt)—($SiO_2$), or (CoCrPtB)—(MgO). In this embodiment, magnetic grains may form a prismatic structure and the nonmagnetic phase may surround the magnetic grains so that the magnetic grains may be separated from each other and interaction between the magnetic grains may be effectively controlled to reduce medium noise, for example.

It is noted that the magnetic disks 12A and 12B for longitudinal magnetic recording and perpendicular magnetic recording are merely illustrative examples of magnetic disks that may be used in the magnetic disk device according to the present embodiment, and other types of magnetic disks may equally be used such as the so-called patterned medium in which recording cells are spaced apart from each other on a substrate.

Referring back to FIG. 2, the magnetic head 20, which is described in detail below, includes a head slider 21 having a guided recording element and a magneto-resistance element (neither of which are shown) for enabling recording/reproducing operations and a suspension main frame 22 that supports the head slider 21.

The magnetic head 20 is supported by an actuator 30 via an arm 31 and is rotated around a rotational shaft 34 in a radial direction of the magnetic disk 12 by an electromagnetic drive force created by a voice coil motor (VCM) 32 arranged at the base of the actuator 30 and a permanent magnet 33 arranged at the top and bottom of the VCM 32.

A VCM drive current may be supplied to the VCM 32 from a VCM/SPM (spindle motor) driver IC mounted on an electronic substrate that is arranged on the rear side of the disk enclosure 11. The moving direction and speed of the magnetic head 20 may be controlled by the direction and level of the VCM drive current.

The disk enclosure 11 also includes a lamp unit 40 as an embodiment of a magnetic head support unit that enables the magnetic head to move away from the magnetic disk 12 when the magnetic disk device 10 is not performing recording/reproducing operations. The lamp unit 40 is arranged along the traveling route of the magnetic head 20 at the outer perimeter side of the optical disk 12.

Figure 5:
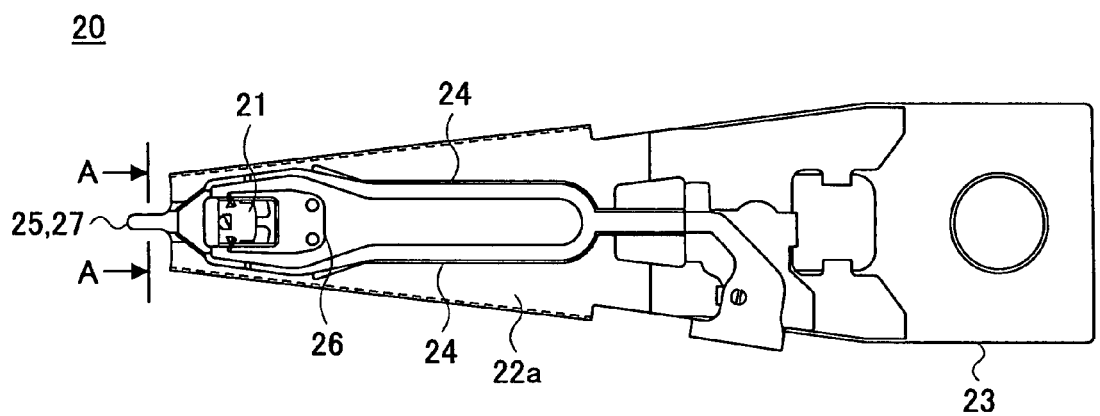
FIG. 5 is a plan view of a magnetic head according to an embodiment of the present invention.
Figure 6:
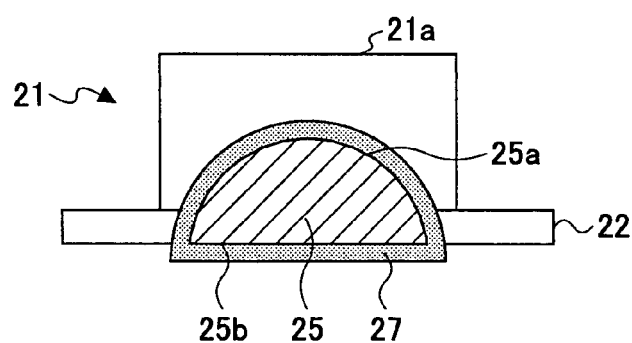
FIG. 6 is a cross-sectional view of the magnetic head cut along line A-A of FIG. 5.

FIG. 5 is a plan view of the magnetic head of the magnetic disk device according to the present embodiment viewed from the head slider side. FIG. 6 is a cross-sectional view of the magnetic head cut across line A-A of FIG. 5.

As is shown in FIGS. 5 and 6, the magnetic head 20 includes a suspension main frame 22a made of a metal plate, a base plate 23 arranged at the base of the suspension main frame 22a, a gimbal 26 arranged at the tip of the suspension main frame 22a, a head slider 21 that is fixed to the gimbal 26, a recording element and a reproducing element of the head slider 21, and a wiring pattern 24 for establishing electrical connection with a preamplifier 36 (see FIG. 2), for example. The base of the suspension main frame 22a may engage the arm 31 of the actuator shown in FIG. 2 to be fixed in place, for example.

The suspension main frame 22a may be made of a metal plate such as a stainless steel plate having a thickness of about 100 μm, for example. In one preferred embodiment, the suspension main frame 22a may function as a plate spring. Specifically, the suspension frame 22a may generate a force that pushes the head slider 21 toward the magnetic disk 12 when the magnetic head 20 flies over the magnetic disk 12, such a force countering a floating force being applied to the surface of the head slider 21 when the magnetic head 12 is flying. By balancing these opposing forces, the distance between the surface of the head slider 21 and the surface of the magnetic disk 22 may be maintained constant. In certain embodiments, the suspension main frame 22a may have a multilayer structure including two or more layers of metal or a resin layer sandwiched between two metal layers, for example.

The head slider 21 includes a base material made of ceramic material (e.g., $Al_2O_3$—TiC), and a guided recording element and a magneto-resistance element that are created at the tip surface of the magnetic head 20 by a thin film process. The head slider 21 has a head slider surface 21a (surface opposing the magnetic disk) on which convex rails or pads are formed for creating an air bearing when the head slider 21 is flying over the magnetic disk 12. The guided recording element may be a ring element in the case where longitudinal magnetic recording is implemented or a single magnetic pole element in the case where perpendicular magnetic recording is implemented, for example. The magneto-resistance element may be a GMR (spin valve magneto-resistance), a TMR (tunneling magneto-resistance), or a BMR (ballistic magneto-resistance), for example. It is noted that in certain embodiments, the head slider 21 may only include one of either the guided recording element or the magneto-resistance element.

The wiring pattern 24 is arranged on the suspension main frame 22a at a predetermined width. The wiring pattern 24 may be created by arranging a foil made of conductive material on an insulating resin layer 15 made of polyimide resin, epoxy resin, or acrylic resin, for example, and covering the foil surface with a protective film 16 made of polyimide resin, for example. In another embodiment, the wiring pattern 24 may be a flexible printed circuit board in which conductive material such as copper foil is sandwiched between polyimide resin layers, for example.

A load bar 25 is arranged to extend from the tip of the suspension main frame 22a. The load bar 25 may be arranged into a pole or a tab, for example. Upon loading and unloading the magnetic head 20, the load bar 25 comes into contact with the surface of the lamp unit 40 so that the magnetic head 20 may be supported by the lamp unit 40. As is described in detail below, in certain embodiments, the load bar 25 may be integrally formed with the suspension main frame 22a, or be made of a metal pole that is fixed to the tip of the suspension main frame, for example.

The cross-sectional shape of the load bar 25 may be a curved shape protruding toward the head slider 21 side. In this way, contact with the lamp unit 40 may be smooth and abrasion of the lamp unit 40 may be reduced, for example.

The lubricating layer 27 is formed on the surface of the load bar 25. In the present embodiment, although the lubricant used in the lubricating layer 27 is not limited to a particular type of lubricant, a fluorine lubricant is preferably used. Examples of fluorine lubricants include fluoro-hydrocarbon, fluoro-polyether, and combinations thereof. It is noted that perfluorohydrocarbon, perfluoropolyether, and combinations thereof are particularly preferred. The fluoro-hydrocarbon, the perfluorohydrocarbon, the fluoro-polyether, and the perfluoropolyether used as the lubricant may either have a straight chain molecular structure or a branched chain molecular structure, for example.

In a preferred embodiment, the weight-average molecular weight of the lubricant may be within a range of 2000-20000. It is noted that when the weight-average molecular weight is less than 2000, the lubricant may be prone to scattering upon forming a physical adsorption layer, which is described in detail below. When the weight-average molecular weight is more than 20000, the viscosity of the lubricant may be increased upon forming the physical adsorption layer so that the motion friction coefficient of the load lamp 25 and the lamp unit 40 may be increased.

In one preferred example, perfluoropolyether used as the lubricating layer 27 may have the following structure:

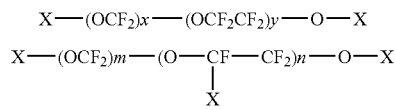

(where x, y, m, and n represent natural numbers and X represents an end group)

It is noted that the end group X of the lubricant molecule may be a polar end group such as $CF_2CHOH$, $C_6H_5$, or a piperonyl group, or a nonpolar end group such as a trifluoromethyl group ($CF_3$). As is described in detail below in relation to a lubricant application process, a lubricant made of molecules having a polar end group is preferably used in view of the fact that a tightly bonded chemical adsorption layer may be formed on the surface 25a of the load bar 25 by applying such a lubricant thereon.

Figure 7:
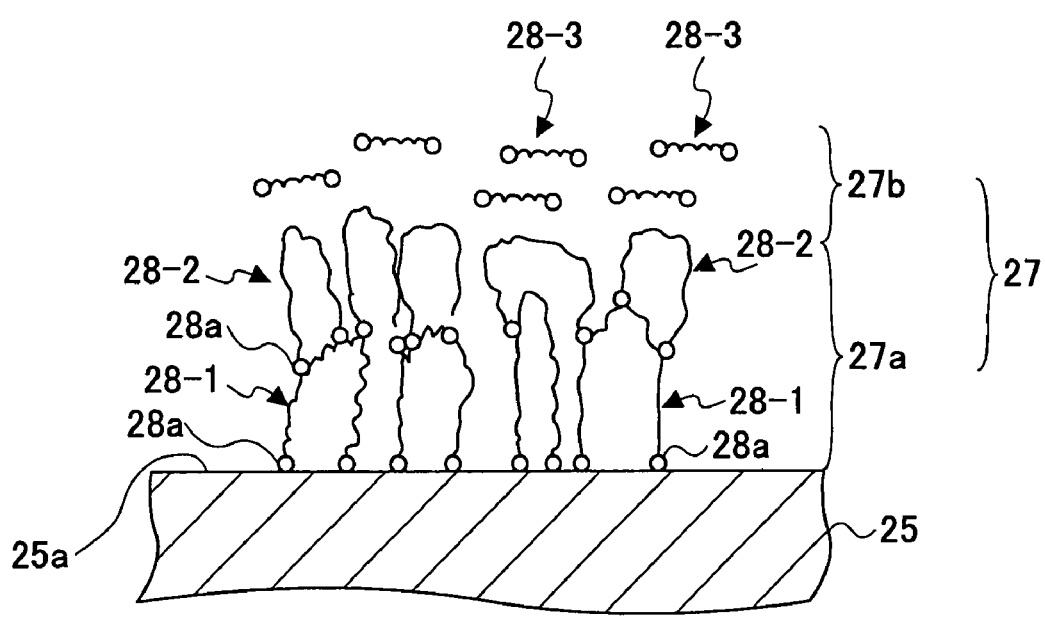
FIG. 7 is a diagram illustrating a configuration of a lubricating layer formed on a load bar.

FIG. 7 is a diagram illustrating a structure of the lubricating layer 27 formed on the load bar 25. As is shown in FIG. 7, the lubricating layer 27 includes a chemical adsorption layer 27a in which molecules 28 of the lubricant form a chemical bond with the surface 25a of the load bar 25 and a physical adsorption layer 27b that is formed by the molecules 28 of the lubricant being deposited on the chemical adsorption layer 27a. The chemical adsorption layer 27a is made up of molecules 28-1 with end groups 28a that bond with the surface 25a of the load bar 25 and molecules 28-2 with end groups 28a that bond with the molecules 28-1. On the other hand, the physical adsorption layer 27b is made up of molecules 28-3 that do not bond with each other.

In the chemical adsorption layer 27a, molecules are tightly bonded with the surface 25a of the load bar 25 or with each other. It is noted that in the case where the end groups 28a of the lubricant correspond to polar end groups, the chemical adsorption layer 27a may be formed on the surface 25a of the load bar 25 by merely applying the lubricant on the surface 25a. In the case where the end groups 28a of the lubricant correspond to nonpolar end groups, the chemical adsorption layer 27a having molecules 28-1 bonding with the surface 25a of the load bar 25 and molecules 28-2 bonding with the molecules 28-1 may be formed by irradiating high energy light on the surface 25a after applying the lubricant, for example.

In one embodiment, the lubricating layer 27 may only include the chemical adsorption layer 27a. In this way, shock generated when the load lamp 25 comes into contact with the surface of the lamp unit 40 may be reduced, and abrasion of the lamp unit 40 cause by the sliding motion of the load lamp 25 may be reduced, for example.

In a more preferred embodiment, the lubricating layer 27 has a layered structure including the chemical adsorption layer 27a and the physical adsorption layer 27b as is shown in FIG. 7. By arranging the lubricating layer 27 to have such a configuration, the molecules of the physical adsorption layer 27b that are applied a shock when the load bar 25 comes into contact with the surface of the lamp unit 40 may move in horizontal directions so that the shock may be diffused. Thus, abrasion of the lamp unit 40 may be reduced even further compared to a lubricating layer 27 that only has the chemical adsorption layer 27a in which case movement of the lubricant molecules is restricted.

The thickness of the lubricating layer may be within a range of 0.5-10 nm, and preferably within a range of 1.0-2.0 nm. It is noted that the thickness of the lubricating layer may be obtained through X ray photoelectron spectroscopy, FT-IR (Fourier Transform Infrared Ray) spectrometry, or ellipsometry, for example. In the case of measuring a small area such as the load bar, the microscopic FT-IR spectroscopy is preferably used.

The fixation rate of the lubricating layer (thickness of chemical adsorption layer÷thickness of lubricating layer× 100(%)) is preferably within a range of 30-100%, and more preferably within a range of 50-100%. It is noted that the thickness of the chemical adsorption layer may be obtained using the above-mentioned measuring methods after the lubricating layer is washed by a solvent. It is noted that a diluent solution of the lubricant may be used as the solvent for washing the lubricating layer, and the solvent washing may be performed by immersing the load bar 25 in the solvent for approximately one minute.

In the following, loading and unloading operations of the magnetic head are described.

Figure 8A:
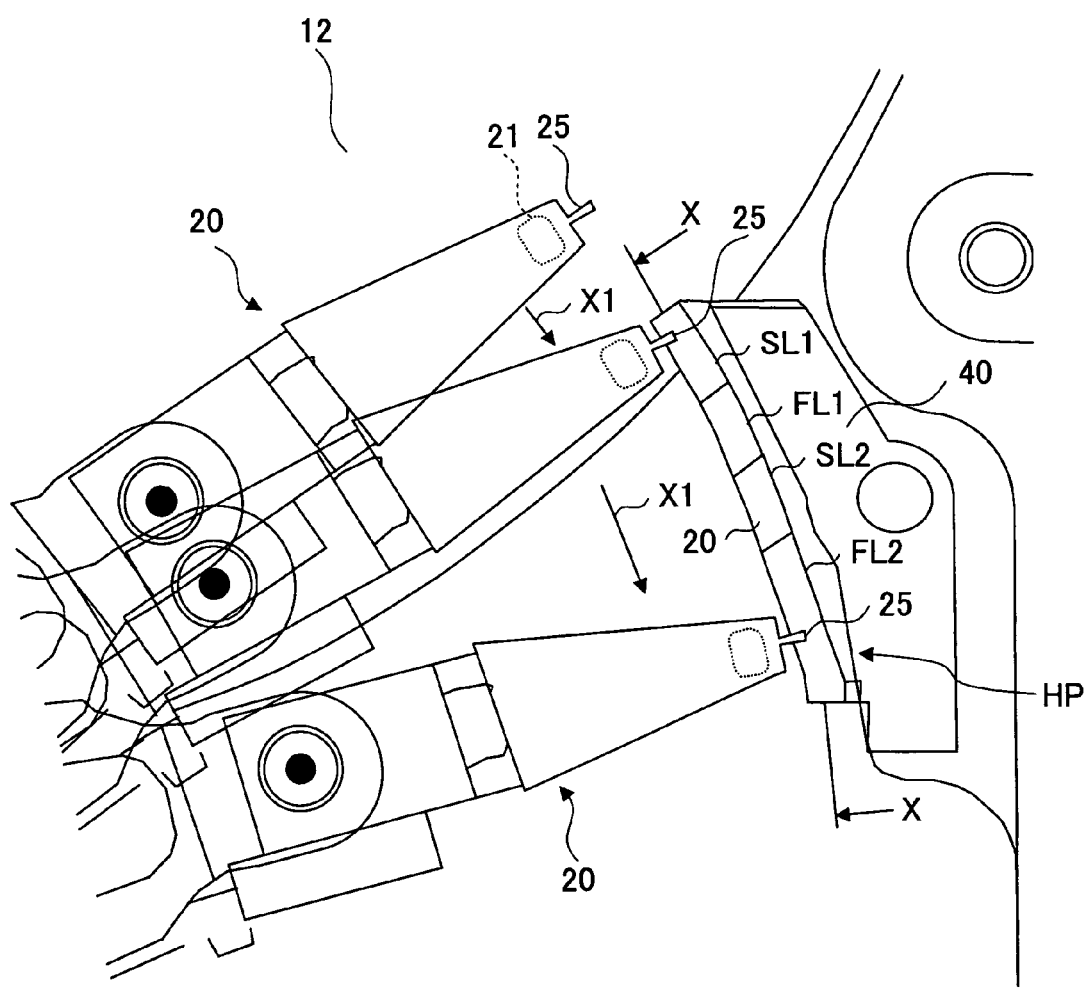
FIG. 8A is a diagram illustrating magnetic head loading operations and unloading operations.
Figure 8B:
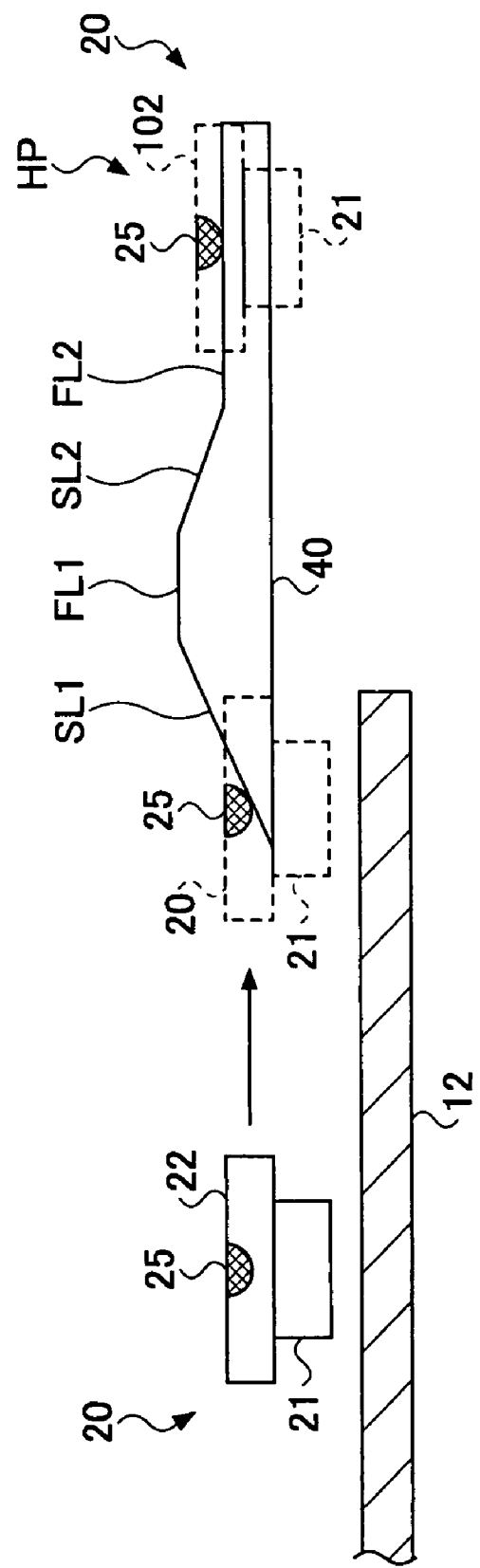
FIG. 8B is another diagram illustrating the magnetic head loading operations and unloading operations.

FIGS. 8A and 8B are diagrams illustrating loading and unloading operations of the magnetic head 20, FIG. 8A being a plan view and FIG. 8B being a cross-sectional view cut along the travel path of the magnetic head 40 (line X-X of FIG. 8A).

As is shown in FIGS. 8A and 8B, the lamp unit 40 includes a first sloped portion SL1 that slopes upward toward the outer perimeter of the magnetic disk 12, a first flat portion FL that extends from the first sloped portion SL1, a second sloped portion SL2, and a second flat portion FL2. In the unloading operations, the magnetic head 20 that has been flying over the magnetic disk 12 moves toward the outer perimeter of the magnetic disk 12 (direction of arrow X1 of FIG. 8A) so that the load bar 25 comes into contact with the first sloped portion SL1 and moves further outward to be raised upward by the first sloped portion SL1. Thus, the air bearing created between the surface of the magnetic disk 12 and the head slider 21 disappears. The magnetic head 20 moves further with the load bar 25 being in contact with the first flat portion FL1 and then the second sloped portion SL2 to be stationed at a home position HP located at the second flat portion FL2. In the loading operations, the magnetic head 20 moves in the reverse direction of the traveling direction during the unloading operations. That is, the magnetic head 20 moves from the home position HP toward the magnetic disk 12 with the load bar 25 being in contact with the second flat portion FL2, the second sloped portion SL2, the first flat portion FL1, and the first sloped portion SL1. Then, when the load bar 25 is in contact with the first sloped portion SL1, an air bearing is created between the surface of the magnetic disk 12 and the head slider 21 after which the load bar 25 moves away from the first sloped portion SL1.

As can be appreciated from the above descriptions, during unloading and loading operations of the magnetic head 12, the load bar 25 comes into contact with the surface of the lamp unit 40 so that sliding motion occurs between the load lamp 25 and the lamp unit 40. The lamp unit 40 is made of resin is more prone to abrasion than the load bar 25. It is noted that the surface of the first sloped portion SL1 of the lamp unit 40 is particularly vulnerable to abrasion when the load bar 25 collides with the first sloped portion SL1. However, according the present embodiment, the lubricating layer 27 is arranged on the surface of the load bar 25 so that the friction coefficient of the surface of the lamp unit 40 may be decreased, and abrasion of the lamp unit 40 may be reduced. It is noted that abrasion of the lamp unit 40 may be adequately prevented by having the lubricating layer 27 arranged at least on the head slider 21 surface of the load bar 25 (surface 25a of FIG. 6) that comes into contact and slides on the lamp unit 40.

In another embodiment, the magnetic head 20 may be configured to perform recording and reproducing operations on the bottom surface side of the magnetic disk 12 in which case the magnetic head 20 may be positioned upside down with respect to the positioning of the magnetic head 20 shown in FIG. 8B and the lamp unit 40 may also be positioned upside down with respect to the positioning of the lamp unit 40 shown in FIG. 8B. The load bar 25 may come into contact with the head slider 21 side surface of the lamp unit 40 in such an embodiment as well so that abrasion of the lamp unit 40 may be prevented by arranging the lubricating layer 27 at least on the head slider 21 side surface of the load bar 25 that comes into contact with the lamp unit 40.

In another embodiment, the lubricating layer 27 may be formed on the surface of the lamp unit 40. In such a case, the friction coefficient between the surface of the lamp unit 40 and the load bar 25 may be reduced even further and generation of abrasive powder of the lamp unit 40 may be prevented even further, for example.

According to the above-described embodiment of the present invention, the lubricating layer 27 is formed on the surface of the load bar 25 so that generation of abrasive powder caused by the sliding motion of the surface of the lamp unit 40 and the load bar 25 may be prevented upon loading and unloading the magnetic head 20 and a reliable magnetic disk device may be realized. It is particularly noted that by including a chemical adsorption layer and a physical adsorption layer in the lubricating layer 27, the friction coefficient between the surface of the lamp unit 40 and the surface of the load bar 25 may be reduced even further, and generation of abrasive powder of the lamp unit 40 may be prevented even further.

Figure 9:
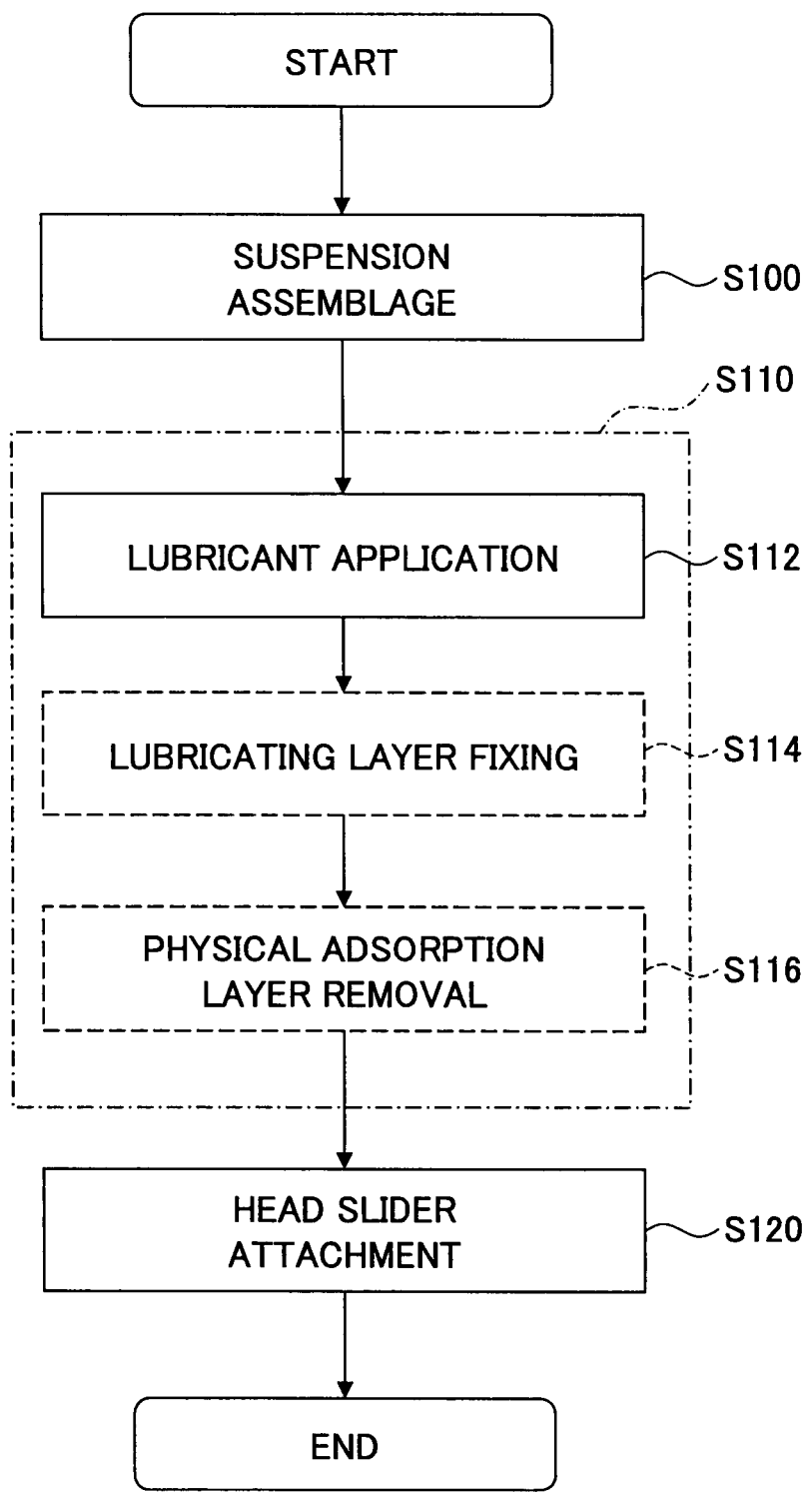
FIG. 9 is a flowchart illustrating process steps for manufacturing a magnetic head according to an embodiment of the present invention.

In the following, a method of manufacturing a magnetic head according to an embodiment of the present invention is described. FIG. 9 is a flowchart illustrating process steps for manufacturing the magnetic head 20.

In FIG. 9, first, a suspension is assembled (step S100). Specifically, the suspension main frame 22a as is shown in FIG. 5 is molded by a punching process, for example, and in the case where the load bar 25 is integrally formed with the suspension main frame 22a, the load bar 25 may be formed in this step as well. On the other hand, in the case where the load bar 25 is formed as a separate member from the suspension main frame 22a, the load bar 25 is mounted at the tip of the suspension main frame 22a in this step.

Further, the base plate 23 is mounted at the base of the suspension main frame 22a, and the gimbal 26 is mounted at the tip of the suspension main frame 22a. It is noted that the order in which the load bar 25, the base plate, and the gimbal 26 are mounted may be arbitrary. Then the wiring pattern 24 is formed or mounted on the suspension main frame 22a.

Then, a lubricating layer is formed on the load bar 25 (step S110). In the illustrated embodiment, the step of forming the lubricating layer includes a process of applying a lubricant on the load bar 25 (step S112), a process of fixing the lubricating layer as is necessary of desired (step S114), and a process of removing the physical adsorption layer of the lubricating layer (step S116).

The lubricant application process (S112) involves applying a lubricant on the load bar through a dip method (pull-up method, pull-down method) or spray method performed using a lubricant diluent solution. The lubricant diluent solution may be created by diluting the lubricant with 2,3-Dihydrodecafluoropentane or Hexafluoroisopropanol, for example. Commercial diluents that may be used include Novek HEF (product name) by 3M and Vertrel (registered trademark) XF by Dupont, for example.

In certain embodiments, fluoro-hydrocarbon or fluoro-polyether may be used as the lubricant. Specifically, a lubricant having a polar end group such as Fomblin (registered trademark) Z-Dol (product name) (end group: $—CF_2CHOH$) or AM3001 (product name) (end group: piperonyl group) by Solvay Solexis may be used, for example.

Alternatively, a lubricant having a nonpolar end group such as Fomblin (registered trademark) Z15, Z25 (product names) made of straight chain molecules, Y25 or YR1800 (product names) made of branching chain molecules by Solvay Solexis may be used, for example. It is noted that the end group of the above-mentioned lubricants may be a trifluoromethyl group.

Figure 10A:
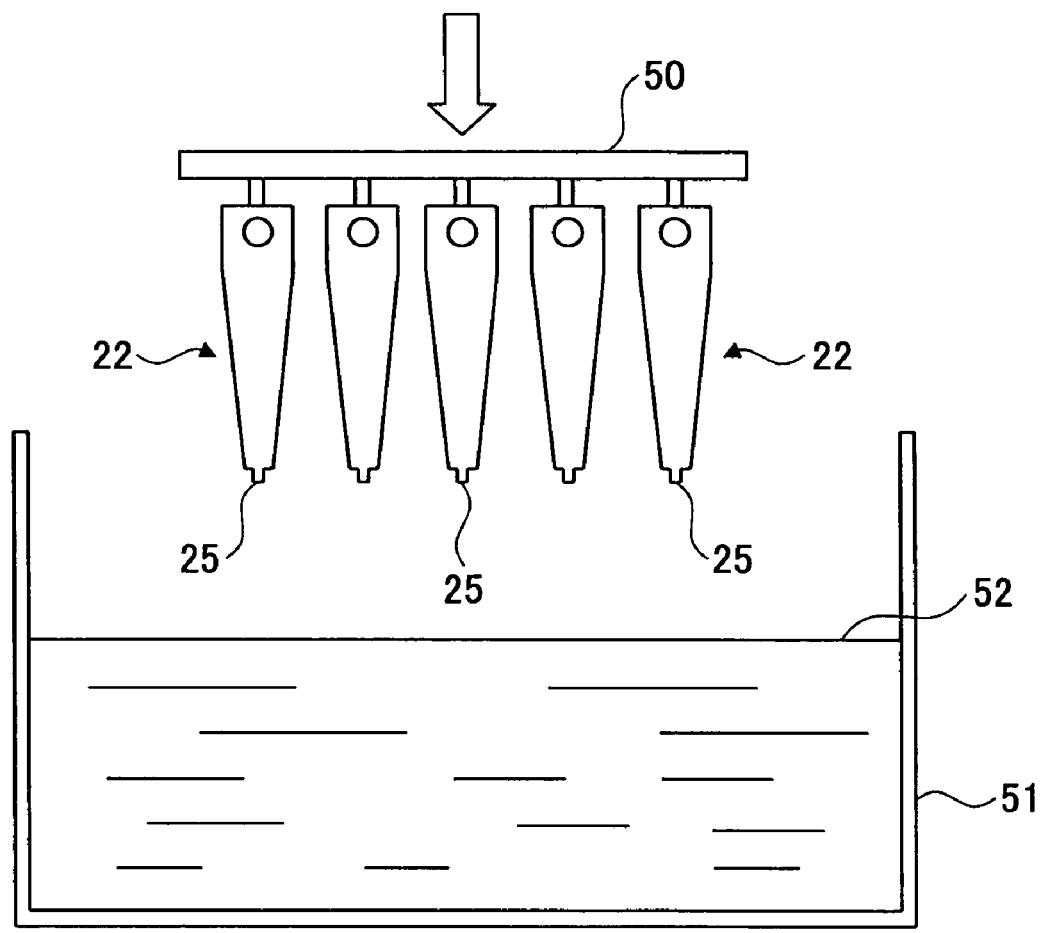
FIG. 10A is a diagram illustrating a method of applying a lubricant on a load bar using the pull-up method.
Figure 10B:
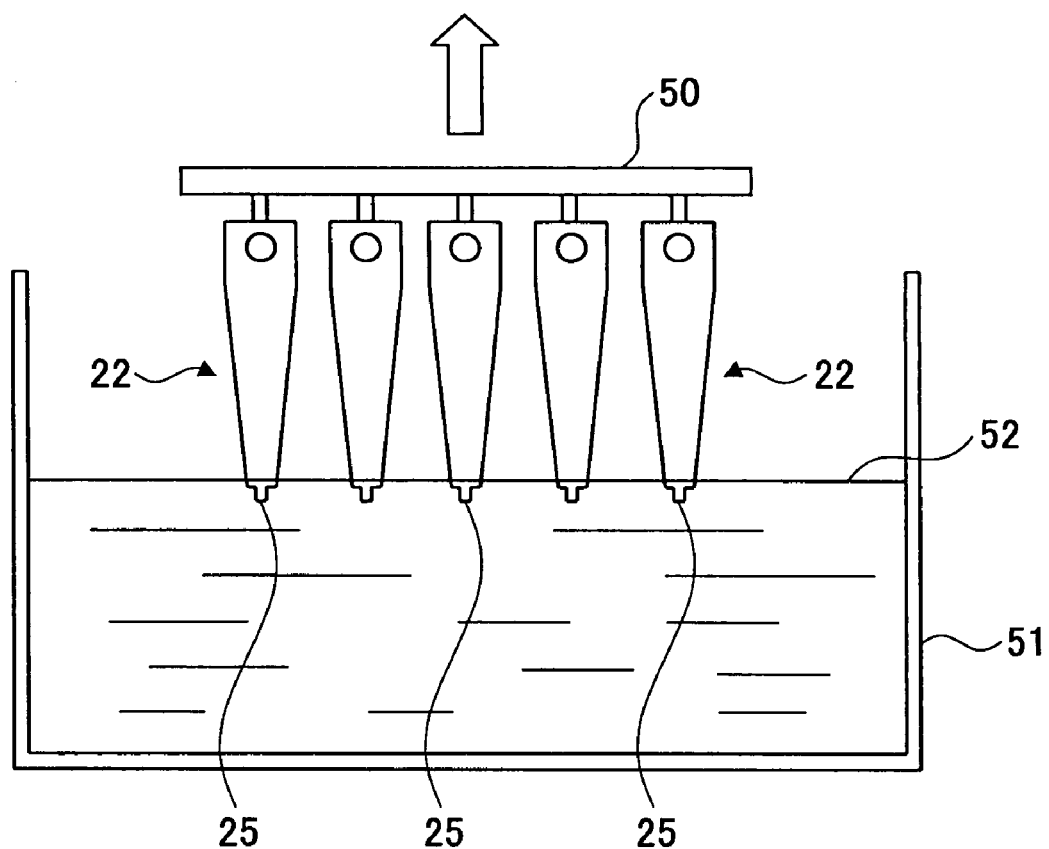
FIG. 10B is another diagram illustrating the method of applying the lubricant on the load bar using the pull-up method.

FIGS. 10A and 10B are diagrams illustrating a method of applying the lubricant on the load bar using the pull-up method.

As is shown in FIG. 10A, assembled suspensions 22 are fixed to a jig 50 that moves up and down at a predetermined speed with the load bars 25 facing downward. In this case, the suspensions 22 preferably have the same height and are vertically fixed to the jig 50.

As is shown in FIG. 10B, the suspensions fixed to the jig 50 are dipped into a lubricant diluent solution 52 that is contained in a lubricant application tank 51 and held therein for a predetermined time after which the suspensions 22 are pulled up at a predetermined speed. In a preferred embodiment, only the load bars 25 are dipped into the lubricant diluent solution in this process. Then, the solvent contained in the lubricant forming lubricating layers on the load bars 25 are left to evaporate naturally. In a preferred embodiment, the concentration of the lubricant diluent solution 52 and the pull-up speed of the load bars 25 are adjusted so that the thickness of the lubricating layers may be within a range of 1-2 nm after evaporation of the solvent. The concentration of lubricant in the lubricant diluent solution 52 may be adjusted to be approximately 0.2% by weight in a case where Vertrel (registered trademark) XF is used as the solvent and Fomblin (registered trademark) AM3001 (product name) is used as the lubricant, for example.

Then, a fixing process for fixing the lubricating layer may be performed as is necessary or desired (step S114). Specifically, the lubricating layer fixing process may involve a thermal process and a high energy light irradiation process, for example. The high energy light used in the high energy light irradiation process may be an ultraviolet ray, an X-ray, an electron ray, or a convergent ion beam, for example. It is noted that a vacuum ultraviolet ray with a wavelength of 172 m irradiated from a high luminance excimer vacuum ultraviolet lamp and an electron ray are particularly preferred.

The lubricating layer thermal process may involve heating the suspension 22 having the lubricating layer formed on the load bar to a temperature of 80-200° C. using an oven or a RTP furnace, for example. In the case where a lubricant made up of molecules having a polar end group is used, at least a part of the physical adsorption layer may be converted to the chemical adsorption layer by heating the lubricating layer so that the thickness of the chemical adsorption layer may be increased. In the case where a lubricant made up of molecules having a nonpolar end group is used, adsorption sites may be created at the surface of the load bar and at the molecules themselves so that a strong bond may be realized between the molecules of the lubricant and the surface of the load bar or between the molecules, for example.

An ultraviolet ray irradiation process may involve irradiating a high luminance ultraviolet ray on the suspension having the lubricating layer formed on the load bar using a mercury lamp of an excimer vacuum ultraviolet lamp, for example. By irradiating the ultraviolet ray, the surface of the load bar may be activated, and adsorption sites for the molecules of the lubricant may be increased so that the thickness of the chemical adsorption layer may be increased, for example.

It is noted that an excimer vacuum ultraviolet lamp, particularly a Xenon excimer lamp that uses Xenon gas, is capable of emitting a high luminance vacuum ultraviolet ray with a wavelength of 172 m so that a fixing process may be efficiently performed using such a lamp. However, it is noted that this process has to be performed within a container having a vacuum atmosphere in order to prevent attenuation of the ultraviolet ray by air, for example.

An electron beam irradiation process may involve emitting an electron beam using an electron gun, and irradiating an electron beam with an accelerating voltage of 10 kV on the lubricating layer 27 of the load bar within a container having a vacuum atmosphere, for example. The surface of the load bar that is irradiated with the electron beam may be activated as in the case of ultraviolet ray irradiation as is described above so that adsorption sites of the molecules of the lubricant may be increased and the thickness of the chemical adsorption layer may be increased. In other embodiments, ultraviolet ray laser irradiation or infrared ray laser irradiation may be performed as the high energy light irradiation process.

Then, a process of removing the physical adsorption layer of the lubricating layer may be performed as is necessary or desired (step S116). The physical adsorption layer removal process may involve dipping the suspension 22 in the solvent as is described above, taking the suspension 22 out of the solvent, and drying the suspension 22 through natural evaporation. By performing such a process, at least a portion of the physical adsorption layer of the lubricating layer may be removed so that the thickness of the physical adsorption layer may be controlled.

Then, a head slider that is separately fabricated is attached to the gimbal of the suspension (step S120). The head slider may be fabricated by creating a magnetic resistance element and a guided recording element on an AlTiC wafer by a semiconductor process, cutting out individual head sliders by a dicing process, and processing the air bearing surfaces of the head sliders, for example. Then, the wiring pattern is connected to an electrode of the head slider.

In another embodiment, the lubricating layer of the load bar may be formed after the head slider is attached to the suspension; however, the process flow of FIG. 9 may be preferred since the lubricant may be prevented from adhering to the head slider.

In the following specific examples of creating the lubricating layer are described.

Example 1

Perfluoropolyether (straight chain molecule; weight-average molecular weight: 9500) having a trifluoromethyl group at each molecular end is diluted by a solvent made of 2,3-dihydrodecafluoropentane to prepare a diluent solution with a lubricant concentration of 0.2 wt %, and the resulting diluent solution is applied to the surface of the load bar using the pull-up method to form a lubricating layer with a thickness of 1.5 nm. The lubricating layer created in this manner is mostly made up of a physical adsorption layer at this point, and the fixation rate of the lubricating layer is substantially close to 0%.

Then, an ultraviolet ray (wavelength: 172 nm) is irradiated on the lubricating layer for several seconds using an excimer vacuum ultraviolet lamp so that the fixation rate of the lubricating layer may be approximately 90%. In this way, a lubricating layer including a chemical adsorption layer may be formed on the surface of the load bar using a lubricant having a nonpolar end group.

Example 2

Perfluoropolyether (straight chain molecule; weight-average molecular weight: 4000) with both molecular ends corresponding to —$CF_2CHOH$ is diluted by a solvent made of 2,3-dihydrodecafluoropentane to prepare a diluent solution with a lubricant concentration of 0.2 wt %, and the resulting diluent solution is applied to the surface of the load bar using the pull-up method to form a lubricating layer with a thickness of 1.5 nm. The lubricating layer created in this manner is estimated to have a fixation rate of approximately 70%. In this example, the lubricant fixing process and the physical adsorption layer removal process are not performed. In this way, a lubricating layer including a chemical adsorption layer may be formed on the surface of the load bar using a lubricant having a polar end group.

Example 3

The suspension obtained in the above-described Example 2 that has the lubricating layer formed on the load bar is thermally processed in a clean oven at a temperature of 180° C. for a processing period of 60 minutes. In this way, the fixation rate of the lubricating layer may be increased compared to Example 2.

Example 4

The suspension obtained in the above-described Example 2 that has the lubricating layer formed on the load bar is dipped in 2,3-dihydrodecafluoropentane for 5 minutes. In this way, the fixation rate of the lubricating layer may be increased with respect to Example 2, and the fixation rate in this example may be close to 100%.

By implementing a method of manufacturing a magnetic head according to an embodiment of the present invention, a lubricating layer may be formed on a load bar of a suspension so that the friction coefficient between the load bar and a lamp unit may be reduced and generation of abrasive powder caused by the sliding motion between the load bar and the lamp unit may be reduced.

Although the present invention is descried above with respect to certain preferred embodiments, the present invention is not limited to these embodiments, and variations and modifications may be made without departing from the scope of the present invention.

What is claimed is:

1. A magnetic head used in a lamp load type magnetic disk device, the magnetic head comprising:
a head slider including at least one of a recording element and a reproducing element; and
a suspension that supports the head slider; wherein
the suspension includes a magnetic head support unit arranged at a tip portion which magnetic head support unit comes into contact with a lamp unit of the magnetic disk device when at least one of magnetic head loading operations and magnetic head unloading operations are performed and has a surface on which a lubricating layer is formed.

2. The magnetic head as claimed in claim 1, wherein
the lubricating layer includes a chemical adsorption layer that forms a chemical bond with the surface of the magnetic head support unit.

3. The magnetic head as claimed in claim 1, wherein
the lubricating layer undergoes at least one of a high energy light irradiation process and a thermal process.

4. The magnetic head as claimed in claim 1, wherein
the lubricating layer includes at least one of fluoro-hydrocarbon and fluoro-polyether.

5. The magnetic head as claimed in claim 4, wherein
the lubricating layer includes a lubricant molecule having at least one of a perfluorohydrocarbon main chain and a perfluoropolyether main chain.

6. The magnetic head as claimed in claim 4, wherein
the lubricating layer includes a lubricant molecule having a perfluoropolyether main chain and a polar end group.

7. The magnetic head as claimed in claim 4, wherein
the lubricating layer includes a lubricant molecule having a perfluoropolyether main chain and a nonpolar end group.

8. The magnetic head as claimed in claim 1, wherein
the lubricating layer includes a chemical adsorption layer and a physical adsorption layer; and
a thickness of the chemical adsorption layer is arranged to be within a range of 30-100% of a thickness of the lubricating layer.

9. The magnetic head as claimed in claim 8, wherein
the lubricating layer includes only the chemical adsorption layer.

10. The magnetic head as claimed in claim 1, wherein
the surface of the magnetic head support unit that comes into contact with the lamp unit is arranged into a convex curved shape and the lubricating layer is formed on said surface.

11. A lamp load type magnetic disk device comprising:
a magnetic disk;
a lamp unit; and a magnetic head that includes a head slider having at least one of a recording element and a reproducing element, and a suspension that supports the head slider; wherein the suspension includes a magnetic head support unit arranged at a tip portion which magnetic head support unit comes into contact with the lamp unit when at least one of magnetic head loading operations and magnetic head unloading operations are performed and has a surface on which a lubricating layer is formed.

12. The magnetic disk device as claimed in claim 11, wherein the lamp unit has a surface on which another lubricating layer is formed.

13. A method of manufacturing a magnetic head that is used in a lamp load type magnetic disk device, the method comprising the steps of:

assembling a suspension that includes a magnetic head support unit that comes into contact with a lamp unit of the magnetic disk device when at least one of magnetic head loading operations and magnetic head unloading operations are performed; and forming a lubricating layer on a surface of the magnetic head support unit.

14. The method as claimed in claim 13, wherein the step of forming the lubricating layer includes a process of applying on the surface of the magnetic head support unit a lubricant diluent solution that is prepared by diluting a lubricant made up of a lubricant molecule having at least one of a perfluororohydrocarbon main chain and a perfluoropolyether main chain.

15. The method as claimed in claim 14, wherein the step of forming the lubricating layer includes a lubricating layer fixing process for creating a chemical adsorption layer that forms a chemical bond with the surface of the magnetic head support unit which lubricating layer fixing process is performed after the process of applying the lubricant diluent solution.

16. The method as claimed in claim 15, wherein the process of fixing the lubricating layer involves at least one of heating the lubricating layer and irradiating high energy light onto the lubricating layer.

17. The method as claimed in claim 16 wherein the high energy light is one type of light selected from a group including an ultraviolet ray, an X-ray, an electron ray, and a convergent ion beam.

18. The method as claimed in claim 15, wherein in a case where the lubricant molecule has a polar end group, the step of forming the lubricating layer involves performing a process of removing at least a portion of a physical adsorption layer of the lubricating layer after performing the process of applying the lubricant diluent solution or the lubricating layer fixing process.

19. The method as claimed in claim 15, wherein in a case where the lubricant molecule has a nonpolar end group, the step of forming the lubricating layer involves performing the lubricating layer fixing process after performing the process of applying the lubricant diluent solution.

20. The method as claimed in claim 19, wherein the step of forming the lubricating layer includes a process of removing at least a portion of a physical adsorption layer of the lubricating layer after performing the lubricating layer fixing process.

* * * * *